May 2, 1950
A. V. WRIGHT
2,506,478
INSTRUMENT FOR TESTING PAPER
Filed June 5, 1947
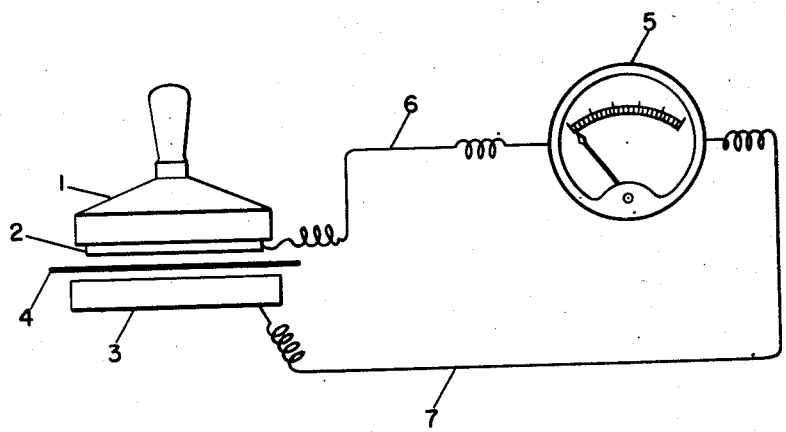
INVENTOR
ALAN VINCENT WRIGHT
BY
Pennie, Edmonds, Morton & Barrows
ATTORNEYS Patented May 2, 1950

2,506,478

UNITED STATES PATENT OFFICE 2,506,478

INSTRUMENT FOR TESTING PAPER

Alan Vincent Wright, Glasgow, Scotland, assignor to Kelvin, Bottomley & Baird, Limited, Glasgow, Scotland, a company of Great Britain Application June 5, 1947, Serial No. 752,715
In Great Britain October 12, 1945

Section 1, Public Law 690, August 8, 1946
Patent expires October 12, 1965

4 Claims. (Cl. 175—183)

The subject of this invention is an instrument for use in the control of paper making devised to test the size content of any particular grade of paper, and thus to permit regulation of the quality of the paper passing through a paper making machine.

An instrument according to the invention comprises a first electrode the bottom of which is plane on the underside, and which is in the form of a slab of sintered metal.

A flat plate of metal dissimilar to the metal of the said electrode forms a second electrode.

One terminal of a sensitive electrical measuring instrument is connected to the first electrode; the other terminal is connected to the second electrode.

In practice, the first electrode is saturated with distilled water and left so that the sintered mass of metal is wet on the outside. A sample sheet of paper to be tested is laid over the flat plate and the first electrode is laid on top of the paper sheet and plate, forming a galvanic cell. At the instant of contact of the first electrode and the paper a stop watch or other time recorder is started and the time taken for the electrical instrument to show a predetermined reading is noted. Alternatively, mechanical means may be provided to set the time recorder in operation as soon as the first electrode is laid on the paper.

The time taken for the electrical instrument to show a predetermined reading is a measure of the size content of the paper, as the internal resistance of the cell falls as permeation takes place.

In practice, the first electrode may be of sintered bronze and the second electrode may be of zinc.

Instead of the first electrode being of sintered metal, the second electrode may be provided with a sintered metal top and piped to an adjoining chicken fountain adapted to be raised or lowered, so that the level in the mountain may be altered so as just to maintain the top of the sintered metal wet. In this case the first electrode may be of zinc, provision being made for maintaining the paper sample clear of the wet sintered metal until the application of the upper zinc slab.

A practical embodiment of the invention is illustrated semi-diagrammatically in the accompanying drawing.

In the drawing, 1 denotes a holder having a bottom consisting of a slab 2 of sintered bronze. 3 denotes a flat plate of zinc. 4 denotes a sheet of paper the size content of which is to be determined. A sensitive electrical measuring instrument is indicated at 5, said instrument being in electrical connection with the slab 2 and the plate 3 by wires 6 and 7, respectively.

In use, the sheet 4 of paper is laid on the plate 3, and the slab 2 is wetted either externally or by putting water in the holder and allowing the water to percolate through the sintered metal. The slab 2 is then laid on top of the paper 4 resting on the plate 3, the time being noted.

The slab, the plate and the paper now damped from the wet slab form a galvanic cell and the pointer of the electrical measuring instrument 5 begins to move over the scale as the current from the cell increases in value with increasing dampness of the paper. The time taken for the instrument 5 to show a predetermined reading is a measure of the size content of the paper.

What is claimed is:

1. An instrument for testing sized paper comprising two electrodes of dissimilar metal, the metal of one of said electrodes being sintered and moistened, each of said electrodes presenting a flat surface to permit a test piece of paper to be imprisoned between said electrodes and engaged by the flat surfaces thereof, thereby to constitute a galvanic cell, and a sensitive electrical measuring instrument having two terminals respectively directly connected to the electrodes.

2. An instrument for testing sized paper comprising a pair of electrodes of dissimilar metal arranged for use opposite each other, each electrode presenting a flat surface to the other electrode, whereby a piece of paper to be tested may be inserted between the electrodes and engaged by the flat surfaces thereof, the metal of one of said electrodes being sintered and adapted to supply distilled water to its flat surface and to the test piece of paper when imprisoned between the flat surfaces of the electrodes thereby to constitute a galvanic cell, and a sensitive electrical measuring instrument having a pair of terminals respectively electrically connected directly to the pair of electrodes.

3. An instrument as defined by claim 2 in which the metal of the sintered electrode is bronze.

4. An instrument as defined by claim 2 in which the metal of the sintered electrode is bronze and the metal of the other electrode is zinc.

ALAN VINCENT WRIGHT.

REFERENCES CITED

The following references are of record in the file of this patent:

UNITED STATES PATENTS

| Number | Name | Date |
|---|---|---|
| 1,953,155 | Currier | Apr. 3, 1934 |
| 2,047,638 | Kott | July 14, 1936 |
| 2,265,920 | Maize | Dec. 9, 1941 |

FOREIGN PATENTS

| Number | Country | Date |
|---|---|---|
| 486,856 | Great Britain | June 7, 1938 |